Patented Oct. 16, 1934

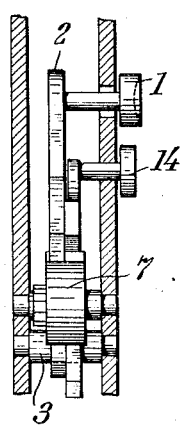
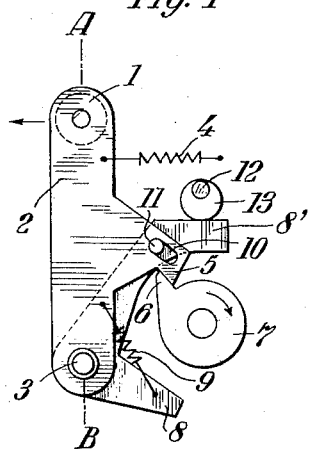
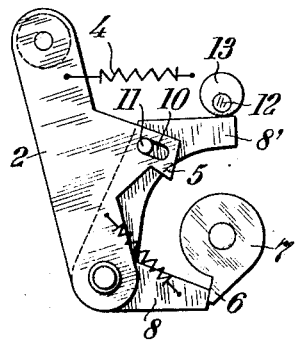
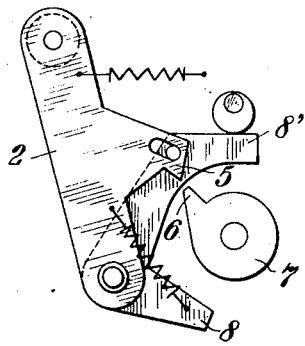

1,977,134

UNITED STATES PATENT OFFICE 1,977,134

STOP FOR MOTION PICTURE APPARATUS

Alfred Lingg and Leo Goldhammer, Munich, Germany, assignors to Agfa Ansco Corporation, Binghamton, N. Y., a corporation of New York Application November 16, 1933, Serial No. 698,349
In Germany November 17, 1932

4 Claims (Cl. 188—1)

Our present invention relates to motion picture apparatus.

One of its objects is to provide a device by which the driving mechanism of the camera can be adjusted for taking single pictures or cinematographic pictures. Further objects will be seen from the detailed specification following hereafter. Reference is made to the accompanying drawing in which Fig. 1 shows a device according to this invention adjusted for taking cinematographic pictures, the driving mechanism being stopped, Fig. 2 shows the device of Fig. 1 adjusted for taking cinematographic pictures with the driving mechanism released, Fig. 3 shows the device adjusted for taking single pictures in its position after a picture has been taken, Fig. 4 is a vertical section of Fig. 1 on the line 4—4.

The hitherto known devices for adjusting a camera for taking single pictures or cinematographic pictures are associated with the drawback that the releasing lever or levers are not provided with a safeguarding. In order to avoid this drawback in taking single pictures, stopping is according to this invention effected by a means which is elastically connected with the releasing lever for the driving mechanism and which follows the movement of the releasing lever in such a manner that the said means and the releasing lever alternately stop the driving mechanism.

The device according to this invention is distinguished by its cheap and simple construction. The device is furthermore most efficient and avoids the drawback that inadvertently cinematographic pictures may be made instead of single pictures as desired.

The invention will now be described with reference to the accompanying drawing.

By pressing the releasing button 1 in direction of the arrow (see Fig. 1), the releasing lever 2 is moved about its pivot 3 against the tension of the spring 4, whereby the finger portion 5 releases the stop 6 of a shaft 7 of the driving mechanism, so that the shaft 7 turns in the direction indicated by the arrow and the mechanism of the camera is started. Immediately beside the releasing lever 2 the axle 3 bears an angle lever 8/8′, the arm 8 of which is elastically connected with the releasing lever by means of a spring 9, while its other arm 8′ is movably connected with the releasing lever by means of a slot and pin connection 10 and 11. The end of the lever arm 8′ bears against the eccentric 13 rotatable about the axle 12 by means of the knob 14 (cf. Fig. 4), except when the releasing lever is in the position indicated in Fig. 1 and the eccentric 13 is adjusted for taking single pictures.

The device acts in the following manner:

When the apparatus is adjusted for taking cinematographic pictures, the eccentric 13 has the position shown in Fig. 1. Thus the angle lever 8/8′ is arrested in a position in which its arm 8 is outside the reach of stop 6, and the shaft 7 may rotate freely as soon as the nose 5 of the releasing lever 2 (see Fig. 2) has been withdrawn. However, when the eccentric is so adjusted that the angle lever 8/8′ can follow the movement of the releasing lever 2 (cf. Fig. 3) the arm 8 will enter the way of the stop 6, thus preventing shaft 7 from further rotation immediately after a single exposure has been made (Fig. 3). If, after the exposure of a single picture the releasing lever is released it follows the tension of the spring 4 and, by means of the pin 11 pushes the angle lever back into the position represented in Fig. 1. The shaft 7 now is no longer arrested by the lever arm 8 and is kept turning until it is arrested again by the nose 5 of the releasing lever 2. The mechanism is now ready for the next single exposure. Of course, it is supposed in the present case that for each turn of the shaft 7, the apparatus should effect one exposure and the film is advanced each time by the height of one picture.

What we claim is:

1. In a motion picture apparatus in combination, a shaft, a stop provided on said shaft, a releasing lever provided with a nose capable of being brought in and out of engagement with said stop, means movably connected with said lever capable of being brought in and out of the way of said stop, and means for bringing said first named means in and out of the way of said stop.

2. In a motion picture apparatus in combination, a shaft, a stop provided on said shaft, a releasing lever provided with a nose capable of being brought in and out of engagement with said stop, means movably and elastically connected with said lever capable of being brought in and out of the way of said stop, and means for bringing said first named means in and out of the way of said stop.

3. In a motion picture apparatus in combination, a shaft, a stop provided on said shaft, a releasing lever provided with a nose capable of being brought in and out of engagement with said stop, an angle lever movably connected with said releasing lever a spring pressing said angle lever against said releasing lever, and means for bringing said angle lever in and out of the way of said stop.

4. In a motion picture apparatus in combination, a shaft, a stop provided on said shaft, a releasing lever provided with a nose capable of being brought in and out of engagement with said stop, an angle lever connected with said releasing lever by means of a pin and slot connection, a spring pressing said angle lever against said releasing lever, and means for bringing said angle lever in and out of the way of said stop.

ALFRED LINGG.
LEO GOLDHAMMER.